United States Patent [19]
Wibbelsman et al.

[11] Patent Number: 5,107,674
[45] Date of Patent: Apr. 28, 1992

[54] CONTROL FOR A GAS TURBINE ENGINE

[75] Inventors: Robert C. Wibbelsman, Sardinia; Robert L. Mayer, Cincinnati, both of Ohio

[73] Assignee: General Electric Company, Cincinnati, Ohio

[21] Appl. No.: 501,442

[22] Filed: Mar. 30, 1990

[51] Int. Cl.$^5$ ............................................. F02C 7/262
[52] U.S. Cl. ................................. 60/39.06; 60/39.141; 364/431.02
[58] Field of Search ............. 60/39.141, 39.142, 39.27, 60/39.29, 39.06; 364/431.02

[56] References Cited

U.S. PATENT DOCUMENTS

| | | | |
|---|---|---|---|
| 3,470,691 | 10/1969 | Smith | 60/39.141 |
| 3,691,759 | 9/1972 | Scheerer | 60/39.141 |
| 4,044,551 | 8/1977 | Nelson et al. | 60/39.141 |
| 4,060,980 | 12/1977 | Elsaesser et al. | 60/39.27 |
| 4,597,259 | 7/1986 | Moore et al. | 60/39.141 |

OTHER PUBLICATIONS

*The Aircraft Gas Turbine Engine and Its Operation*, published by Pratt & Whitney Aircraft Group, Jun. 1980, pp. 106–107.

Primary Examiner—Louis J. Casaregola
Attorney, Agent, or Firm—Jerome C. Squillaro; Bernard E. Shay

[57] ABSTRACT

The invention concerns a starting system for a gas turbine aircraft engine which automatically controls the sequencing of events needed during engine startup. The control schedules fuel in a manner which avoids stalls, and, further, takes corrective actions when stalls occur, both on the ground and in the air. The control detects failures in the starter energy source, which can cause an abortive start and damaging temperatures. The control also provides unique scheduling of fuel in severely cold conditions.

6 Claims, 5 Drawing Sheets

CONTROL FOR A GAS TURBINE ENGINE

The invention relates to controls for gas turbine aircraft engines and, more particularly, to such controls which control the sequence of events occurring during start-up of the engine.

BACKGROUND OF THE INVENTION

To start a gas turbine aircraft engine, the pilot must actuate several engine components in a proper sequence, and with proper timing, based on the flight conditions and response of the engine.

For example, in a typical start, the pilot must assure that the compressor has attained the proper speed, in order to deliver sufficient air to the combustor. The compressor can be driven in at least two ways. When the aircraft is on the ground, the compressor is often driven by a starter motor. When the aircraft is airborne, the compressor can be either driven by the starter motor, or windmilled by incoming air. The pilot must decide whether to windmill or use the starter motor.

When the compressor achieves sufficient speed, the pilot must then actuate the igniters and then the fuel valve. During this procedure, the pilot must monitor several engine parameters, such as rotor speeds, igniter operation, amount of fuel flow, and exhaust gas temperature (EGT). The latter, EGT, requires especially close attention, because excessive EGT can cause significant damage.

One cause of excessive EGT is compressor stall, wherein the compressor ceases to pump the required amount of air into the combustor, causing fuel-air ratio to rise, which, in turn, causes EGT to increase. Compressor stalls can develop quite rapidly, and, can be difficult to detect for that reason. Further, they require rapid interdiction to cure.

The starting procedure is complicated by the fact that different ambient conditions cause different starting behavior, and the pilot must take this factor into account. Further, different engines, even of the same general type, have different starting characteristics, and the differences can become greater as each engine ages, or "deteriorates."

This pilot involvement in engine starting increases the pilot's workload. In addition, aircraft frequently travel to remote locations, which have minimal on-site maintenance facilities. A problem in starting can cause expensive and time-consuming delays.

OBJECTS OF THE INVENTION

It is an object of the invention to provide an improved control system for a gas turbine aircraft engine.

It is a further object of the invention to provide a control system which controls the starting procedures of a gas turbine aircraft engine.

It is a further object of the invention to provide a starting control system for a gas turbine aircraft engine which detects stall-prone engine behavior, and modifies the starting sequence in response.

It is a further object of the invention to sense acceleration just before fuel is injected during a ground start, and if acceleration fall short of a minimum, to indicate to the pilot that the starter energy supply system may be faulty.

It is a further object of the invention to provide a system which automatically cures stalls which occur during starting and, further, during the correction procedure, to delay starter engagement until core speed falls below a limit. One reason for the delay is to prevent damage to the starter shaft, which can occur in attempting to synchronize with a rapidly rotating compressor.

It is a further object of the invention to provide a fuel-scheduling system which automatically compensates for cold weather conditions.

It is a further object of the invention to provide a fuel-scheduling system which compensates for the effects of different metal temperatures in the engine.

SUMMARY OF THE INVENTION

In one form of the invention, the pilot initiates a starting sequence in which automated equipment ascertains whether a stall is occurring. If a stall is detected, fuel flow is temporarily interrupted and then resumed, but at a lower level, in order to cure the stall.

DETAILED DESCRIPTION OF THE INVENTION

Figure 1:
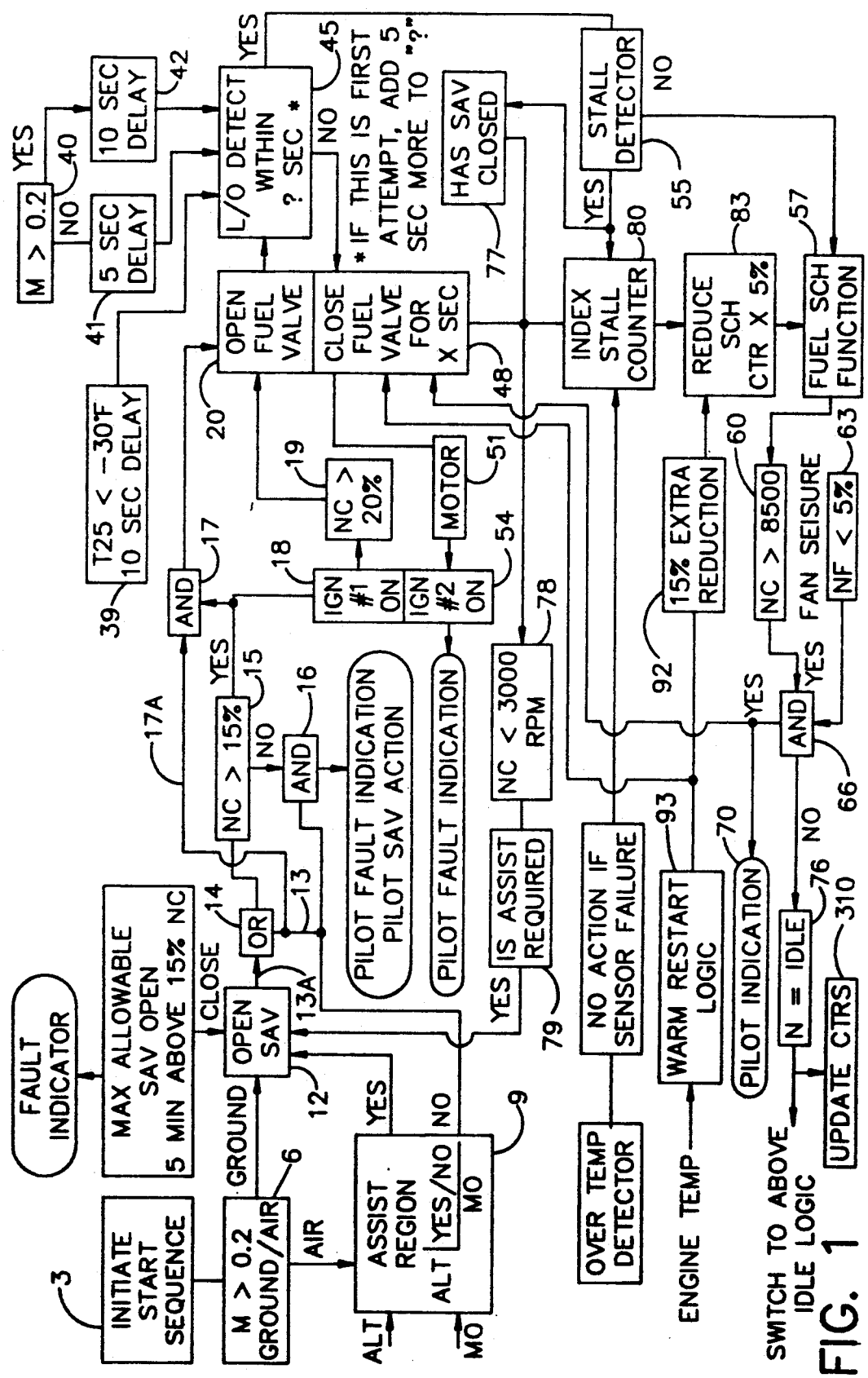
FIG. 1 illustrates an overall diagram of one form of the invention.

FIG. 1: Starting Sequencer

The starting sequence is initiated by pilot actuation, as indicated in block 3 in FIG. 1. (The Full Authority Digital Engine Control, or FADEC, can also initiate starting at this block in some situations, as when a flame out occurs in flight.) Block 6 then inquires whether mach number exceeds 0.2. If so, it is assumed that the aircraft is in the air and the logic proceeds to block 9. If not, it is assumed that the aircraft is on the ground, and the logic proceeds to block 12.

The logic paths beginning from blocks 9 and 12 and ending with block 20 can be grouped into three different types, namely, (1) that used when the aircraft is on the ground; (2) that used when the aircraft is airborne, but not high or fast enough that windmilling can create sufficient compressor speed for starting; and (3) (the converse of (2)) that used when the aircraft is airborne, and high or fast enough that windmilling can be used.

When windmilling cannot be used, block 12 is reached, which opens the starter air valve. Then, because of OR block 14, the logic reaches block 15 in all three cases. Block 15 causes block 18 to actuate the first set of igniters when core speed (NC) exceeds 15 percent of rated maximum speed. Then, block 19 causes block 20 to open the fuel valve when core speed exceeds 20 percent. Thus, so far, in all three cases, the fuel valve opens when core speed exceeds 20 percent.

However, an alternate logic path is available when windmilling can be used (i.e., when starter assistance is not required). Line 13 can avoid block 14 and reach block 17. Block 17, in effect, inquires whether core speed exceeds 15 percent AND whether the aircraft is travelling sufficiently high or fast that starter assistance is not needed. If so, block 17 allows block 20 to open the fuel valve, even if core speed does not reach the 20 percent threshold in block 19, but is only at the 15 percent threshold established by block 15.

One primary reason for the alternate path of AND block 17 is that, sometimes, opening the fuel valve can wet the igniters and thwart starting attempts. To avoid this problem, block 19 requires that core speed exceed 20 percent before fuel is applied. This higher core speed causes higher airflow which flushes fuel and vapors from the igniters. However, this 20-percent-requirement is eliminated when the aircraft is airborne, because delays in starting are not desired. Instead, the fuel valve is opened when core speed exceeds only 15 percent of rated maximum.

Between block 18 and 19, the logic inquires whether compressor acceleration is above a threshold. If not, corrective action is taken, such as informing the pilot. The inquiry is made in order to detect an incipient overtemperature condition, which can be caused by improper functioning of the starter energy system. Improper functioning can cause an aborted start, in which the starter system fails to deliver sufficient energy to complete the start. A completed start provides increased airflow to cool the combustion gases, which could otherwise damage the engine.

The hot combustion gases can damage the engine parts because fuel flow is higher than desired at light-off, and consequently fuel/air ratio is higher than desired, causing a high temperature. (The fuel flow is required to be high in order to achieve atomization.)

If the starter energy system functions properly, a successful start can be executed, and the combustion gases become diluted by the now-increased airflow. The inquiry between blocks 18 and 19 detects of the onset of an abortive start (by detecting a lull in acceleration), and allows corrective measures to be taken.

With the fuel valve open, the logic now inquires, in block 45, whether light-off has occurred, but allowing for a time delay. In general, a basic, relatively short, delay of five seconds is used. However, if the aircraft is airborne, or if the weather is cold, the time delay is increased to a larger value.

Specifically, whether the aircraft is airborne is ascertained by mach number. If mach number exceeds a threshold, such as 0.2, blocks 40 and 42 impose a longer delay, such as ten seconds. Whether a delay is warranted based on cold weather is ascertained from T25 (compressor inlet temperature, which is related to ambient temperature), and, if so, block 39 imposes a relatively long delay of ten seconds. One reason for imposing these respective delays is that cold weather can postpone ignition, as can the higher airflow occurring at higher mach numbers.

In addition to the delays just discussed, an additional delay, such as five seconds, is added, as indicated by block 46, during the very first excursion through block 45. The first excursion occurs on the first start attempt, and some extra time is allowed for light-off. One reason for providing the extra time is that it is possible that the fuel manifolds have drained while the aircraft was parked on the ground. The 5-second period serves to fill the manifolds so that fuel is delivered to the combustor.

After waiting the prescribed delay, indicated as "? sec" in block 45, block 45 ascertains whether light-off has occurred. The apparatus which detects light-off is shown in FIG. 3 and described later. If light-off is not detected, the logic proceeds to block 48, which, together with its associated blocks, take the following action, which purges the combustor and then re-introduces fuel.

It is first noted that, historically, gas turbine aircraft engines have frequently used hydromechanical control systems. For various technical reasons, obtaining a time delay in such systems has not been feasible.

Combustor Purging Cycle

Block 48 closes the fuel valve, and block 51 causes the starter air valve to continue to motor the engine for a period of time. The motoring pumps air through the combustor and turbines, and clears out accumulated, unburned, fuel and vapors. During the first excursion through block 48, and if the aircraft is located on the ground (as indicated by mach number), this motoring continues for 30 seconds.

After motoring, block 54 turns on the second igniters, in addition to the first igniters, because it is possible that the first igniters did not work properly. The fuel valve is re-opened, in block 20, and the logic returns to block 45, which again checks for light-off. If light-off again fails to occur on the second check, the fuel valve is again closed, the engine is motored again for 30 seconds, and the logic again proceeds to block 20, which opens the fuel valve.

Block 45 again checks for light-off a third time. If light-off fails to occur a third time, the fuel valve is closed once more, the engine is motored for 30 more seconds and the starting attempt is halted, and the pilot is so informed.

Therefore, the logic makes three excursions through blocks 48, 51, 54, 18,19, 20, and 45 in attempting to achieve light-off. If light-off is not achieved after three attempts, the start is terminated.

If the aircraft is airborne when block 45 seeks to detect light-off, the cycling through blocks 48, 51, 54, 18, 19, 20, and 45 occurs indefinitely until the pilot intervenes. However, in some system designs, termination of fuel flow during the cycling while airborne is not desired. Instead, the function of block 48 is omitted, so that fuel flows continuously during the start attempt.

Stall Corrective Action

Figure 2A:
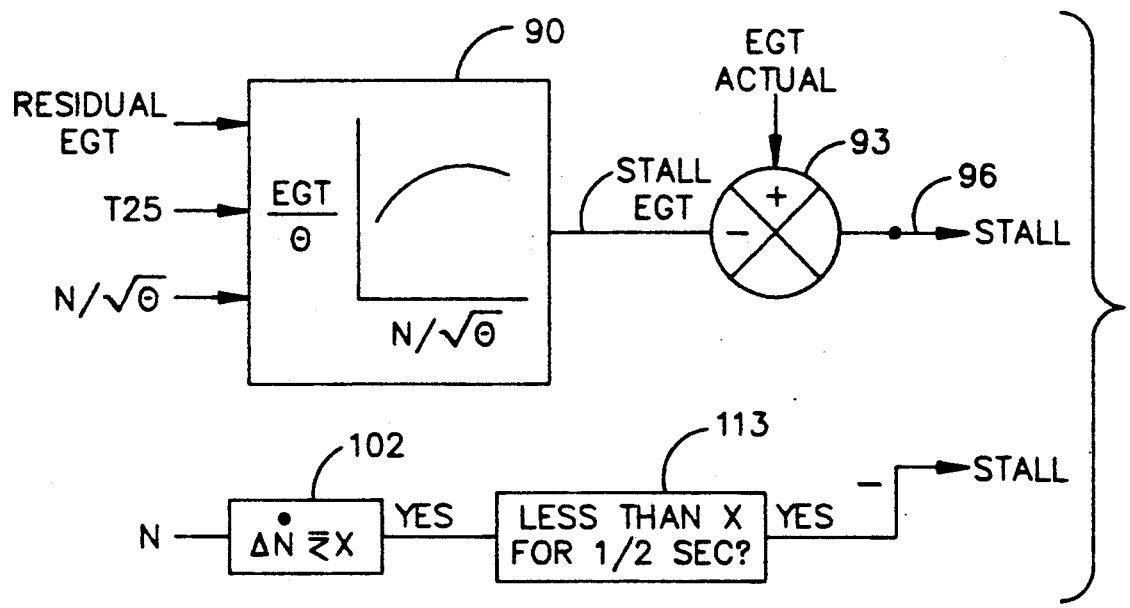
FIG. 2A illustrates a block diagram of a stall detector used when the aircraft is on the ground.
Figure 2B:
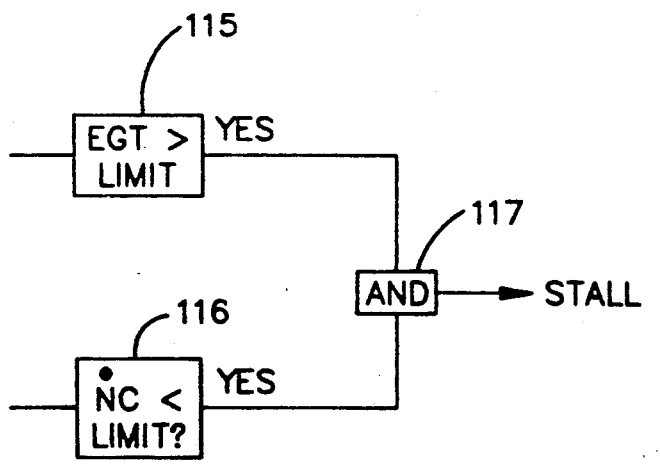
FIG. 2B illustrates a stall detector used when the aircraft is airborne.

If light-off is detected, the logic proceeds to the stall detection procedures. Block 55 inquires whether a stall has occurred. The procedures by which stall is detected are shown in FIGS. 2A and 2B, which are discussed later. If no stall occurs, engine behavior is considered normal so far, and the logic proceeds to block 57, which schedules fuel delivery, and will be described later.

If a stall is detected in block 55, block 77 inquires whether the starter air valve has been shut off. If so, the logic proceeds to block 78. If not, the logic passes through block 48, to blocks 51, 54, 18, 19, 21, and 45.

The inquiry in block 77 is made because another control system, not discussed herein, automatically shuts off this valve when core speed reaches about 50% of rated maximum. Valve shut-off is accompanied by disengagement of the starter gear from the engine, resulting in a speed differential in the gears involved. An attempted starter re-engagement with a large speed differential can shear off the shaft of the starter motor. To prevent this damage, the invention requires, by the operation of blocks 78 and 79, that engine speed fall below 20% before re-engagement is attempted and the start sequence re-instituted. (The fact of disengagement is inferred from engine speed. Of course, other approaches to sensing disengagement can be taken.)

Reaching block 12 re-opens the starter air valve. Simultaneously, block 80 increments a stall counter, which is a number which indicates the number of stalls which have occurred so far during the startup sequence. (This number is now unity in this example.)

The logic path branches at block 80. It branches upward, and inquires whether core speed (NC) is below 20% maximum rpm. If so, starter assistance is required, and block 79 directs the logic to block 12, where the sequences following block 12, and described above, recur. On the other hand, if core speed exceeds 20% rpm, block 48 is reached, which cycles the logic through blocks 48, 51, 54, 18, 19, 20, and 45, in attempting to achieve light-off, as described above.

Fuel Reduction

The other branch at block 80 is downward, to block 83 in FIG. 1, which reduces scheduled fuel by five percent, in order to cure the stall by reducing fuel/air ratio. This reduction becomes implemented when the logic path from the upper branch exits block 55 and reaches the fuel scheduling block 57.

Irrespective of the occurrence of any stalls, block 92 causes a further reduction in fuel flow (by 15 percent, in this example) if the engine is warm. A warm engine is ascertained by the temperature sensors used in the engine, which provide an input to block 91. Other means of determining engine warmth can be employed. When the logic reaches block 57 from block 55, blocks 80 and 83 then exert their influence.

It is possible that, because of repeated stalls, fuel flow has been reduced so greatly that the engine receives only sufficient fuel to merely run, and not accelerate. The engine can "hang up" in a region near idle. To prevent such a hang-up, logic is added between blocks 55 and 57 which examines core speed. If core speed accelerates too slowly, after light-off and in the absence of stall, then fuel flow is gradually increased until one of the following two events occurs: (a) Wf/P3 reaches the value at which it is normally scheduled at this time, or (b) a predetermined acceleration occurs.

After exiting block 57, the logic proceeds to the pair of blocks 60 and 63. The former inquires whether core speed exceeds 55%; the latter inquires whether fan speed falls below 5 percent of rated speed. If both conditions occur (i.e., a high core speed and a very low fan speed) it is possible that the fan has seized, which provides an undesirable thermodynamic condition: engine temperatures can exceed limits and damage can occur. Block 66 causes the logic to inform the pilot of this fact. The pilot can then intervene.

If both core speed and fan speed are proper, the logic proceeds to block 76, which sets demanded engine speed at idle, and returns control of the engine to the FADEC.

This discussion will now consider FIGS. 2A and 2B, which describe in more detail the stall detection of block 55 in FIG. 1.

FIGS. 2A AND 2B

Stall Detection

FIG. 2A depicts the stall detection used on the ground. Block 90 receives three inputs, namely, compressor inlet temperature (T25), corrected core speed (NC/$\sqrt{\Theta}$), and residual EGT. Residual EGT is the exhaust gas temperature occurring just upon startup, and will reflect residual heat remaining from recent engine operation. Block 90 computes a stall EGT, based on the inputs. The stall EGT is compared with actual EGT in summer 93, and if the latter exceeds the former, then a stall is inferred.

In general, a compressor stall causes the fuel/air ratio in the combustor to increase, because the compressor fails to deliver sufficient air. The higher fuel/air ratio causes a hotter combustion temperature. Block 90 computes a stall EGT, which will be reached if a stall occurs at the present operating conditions.

The stall EGT varies with corrected speed, as block 90 indicates. Since stall EGT varies with speed, and since stall is inferred when actual EGT exceeds stall EGT, the stall EGT can be called a sliding EGT limit. It is a limit in the sense that, when it is exceeded, stall is deemed to occur.

A second, independent, detection of stall is made by examining the change in rate of acceleration of compressor speed (i.e., the change in the second time derivative of speed), in block 102. Acceleration is measured periodically by apparatus known in the art. The $\Delta$ NC-dot in block 102 refers to the difference between successive measurements, and indicates the rate of change in acceleration.

For example, if acceleration is 150 rpm per second$^2$ at the first measurement, and then 100 rpm per second$^2$ at the second measurement, the $\Delta$ NC-dot is $-50$. If acceleration then levels off at negative 100, the $\Delta$ NC-dot becomes zero. Thus, in the latter case, even though the engine is accelerating, the rate of change of acceleration is zero.

Block 102 inquires whether the rate is less than a scheduled value, X, which is itself a function of both corrected core speed and altitude. In a simpler embodiment, X can be a constant, such as zero.

Block 113 inquires whether the rate-of-change of acceleration (indicated by $\Delta$ NC-dot) is less than X for 0.5 seconds. (The 0.5 second requirement acts as a noise filter.) If so, a stall is indicated.

FIG. 2B depicts an alternate stall detection which can be used when the aircraft is airborne. Block 115 inquires whether EGT exceeds a limit, and block 116 inquires whether NC-dot (i.e., core acceleration) falls below a limit. If the answer to both inquiries is YES, then both (a) EGT is too hot and (b) core acceleration is too low, and a stall is inferred, by AND gate 117.

This procedure facilitates detection of stall in the presence of acceleration caused by the starter.

FIG. 2B need not be used by all types of aircraft, nor during all parts of the airborne flight envelope. For example, the system of FIG. 2A can also be used at altitudes up to 15,000 feet, in addition to being used on the ground. Helicopters rarely fly above this altitude, and can use the system of FIG. 2A exclusively.

Figure 3A:
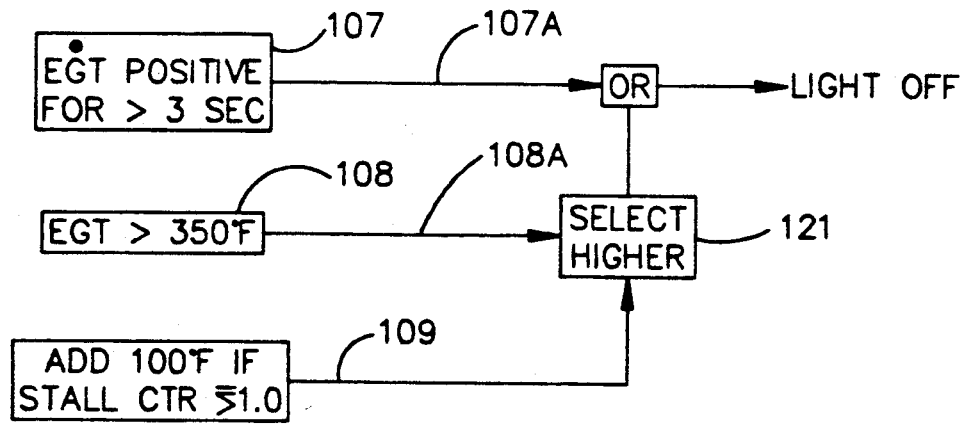
FIGS. 3A and 3B illustrate light-off detectors.
Figure 3B:
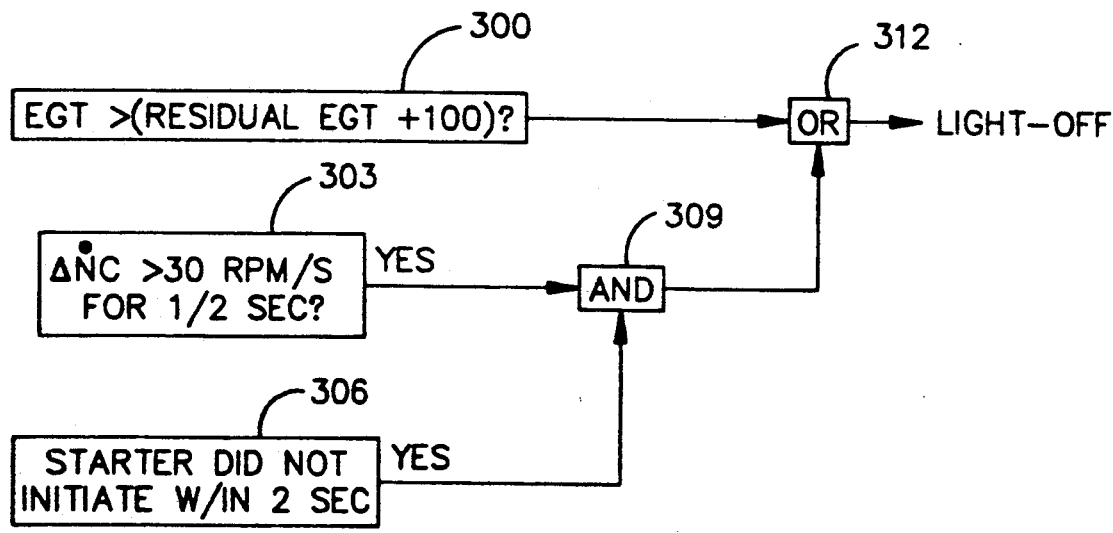

FIGS. 3A and 3B

Light-Off Detection

In FIG. 3B, block 300 inquires whether actual EGT exceeds residual EGT plus an increment. The increment, in this case, is 100 degrees F. If so, OR gate 312 infers light-off.

Block 303 inquires whether the rate of acceleration (discussed in connection with block 102 in FIG. 2A) exceeds 30 rpm/sec for $\frac{1}{2}$ second. Ordinarily, such an excess would light-off. However, the starter motor, upon actuation, produces a large transient acceleration, which could falsely indicate light-off. Thus, block 306 inquires whether the starter was initiated within two seconds. If not, then the influence of the starter is deemed absent, and so AND block 309 allows the 30 rpm/sec in block 303 to indicate light-off.

An alternate approach to light-off detection is shown in FIG. 3A. Block 107 examines EGT and produces a signal, on line 107A, if the time-derivative of EGT (i.e., E-dot) is positive for three seconds. That is, if exhaust gas temperature increases for three seconds, light-off is inferred.

Block 108 examines EGT and produces a signal on line 108A if EGT exceeds a limit value of 350 degrees F. Block 109 makes a similar comparison, but compared with a higher limit value, if a stall has occurred. That is, if the stall counter 203 in FIG. 5, (later discussed) indicates that a stall has occurred, then block 109 adds 100 degrees to the limit, and makes the same comparison. Block 121 selects the larger of these two values by, in effect, ORing the answers of blocks 108 and 109.

Consequently, in practical effect, if stalls have occurred, light-off is inferred only if measured EGT is 450 degrees; otherwise, a stall is inferred if EGT exceeds 350 degrees. The main reason for using this higher limit is that stalls tend to increase EGT, as discussed above.

This discussion will now consider the fuel scheduling indicated in block 57 in FIG. 1.

FIG. 4

Fuel Scheduling

Figure 4:
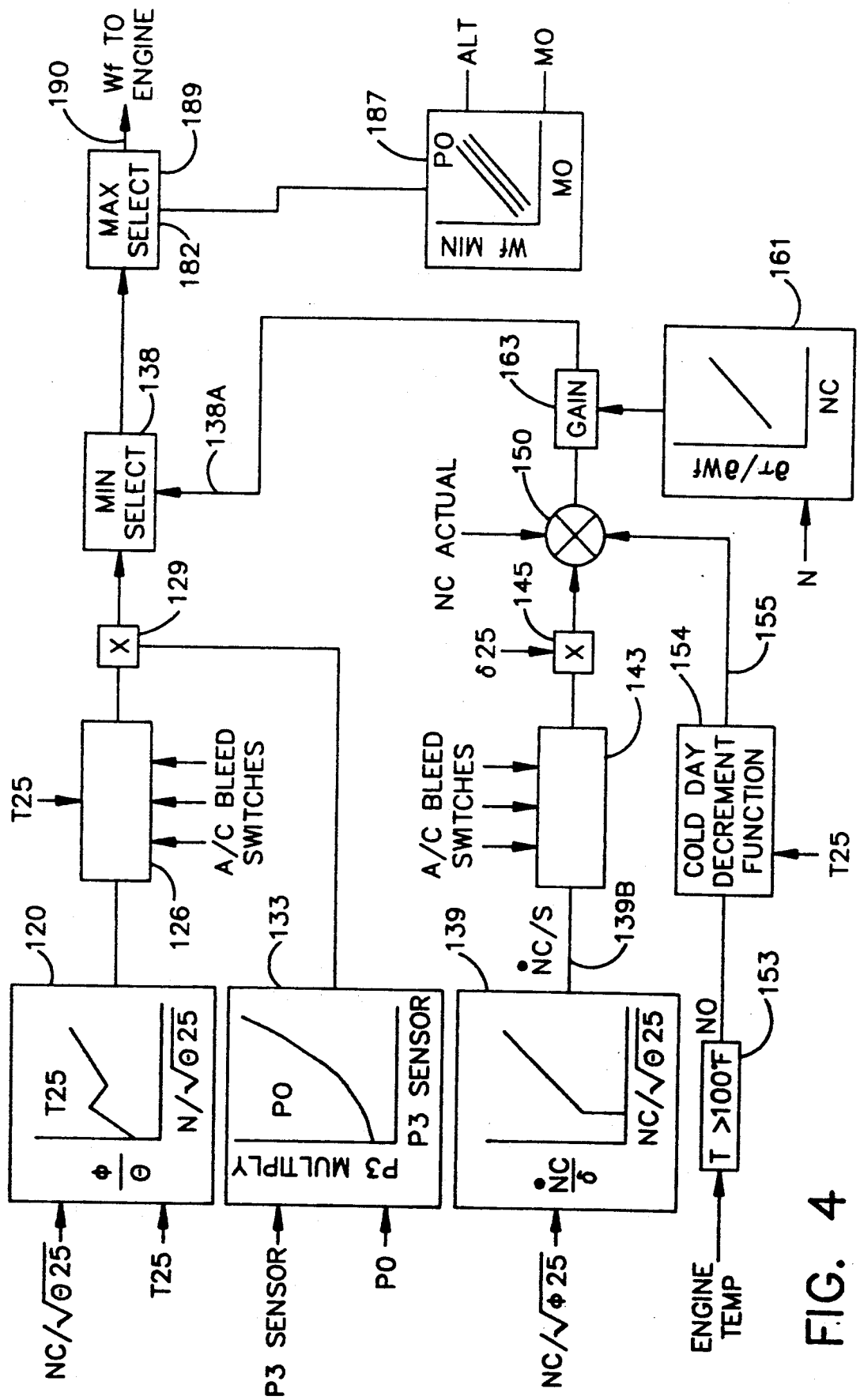
FIG. 4 illustrates a block diagram of fuel-scheduling apparatus.

In FIG. 4, block 120 indicates a customary fuel scheduling function, wherein fuel-air ratio (Wf/P3) is scheduled according to corrected core speed [NC/$\sqrt{\Theta 25}$] and compressor inlet temperature (T25). (In the block, $\phi$ refers to Wf/P3 and $\Theta$ refers to a temperature correction, as known in the art.) In many prior art engines, during starting, fuel is scheduled by a block such as block 120, without the modifications now to be described.

The scheduled flow rate is modified, based on compressor bleed and compressor discharge pressure. One reason for the modification based on bleed is that the bleed changes the amount of air delivered by the compressor to the combustor, thus requiring that fuel flow be reduced if fuel/air ratio is to remain constant. The modification based on bleed occurs in block 126, which receives as inputs information regarding the status of the aircraft bleed valves, which supplies the aircraft with air for purposes such as cabin pressurization. These status indications are designated "A/C Bleed Switches," wherein "A/C" means aircraft.

One reason for the modification based on compressor discharge pressure (P3) is to recover the numerical quantity Wf from the scheduled quantity Wf/P3. That is, fuel/air ratio is scheduled in block 120, but, in practice, fuel flow is the quantity which is controlled; air is only measured. Fuel flow is adjusted, based on measured airflow, in order to attain the desired fuel-air ratio. Airflow is indicated by P3, which is compressor discharge pressure. Since the scheduled quantity is Wf/P3, multiplying by P3 is used to recover the actual value of Wf. The modification based on pressure occurs in block 129, which receives information from block 133 regarding the proper multiplier to apply, based on scheduled compressor discharge pressure, but modified as appropriate.

One example of a required modification is the following. P3 drops as altitude increases. If P3 were fed to gain block 129 without modification, then, at high altitudes, P3 could cause a fuel flow which is so low that atomization of the fuel would fail to occur in the combustor. Thus, one modification is to limit the output of block 133 to a minimum value to prevent such a low fuel flow.

Thus, the output of block 129 is, in effect, a scheduled fuel flow, in pounds per hour, needed to give stall-free operation. This scheduled fuel flow is limited by MIN SELECT block 138 to a maximum value present on line 138A. This limiting serves to prevent fuel scheduling from bringing the engine to an operating point close to the stall boundary.

Limit Fuel Based on Stall

The limit computation begins in block 139, which computes a desired acceleration, based on corrected core speed (NC/$\sqrt{\Theta 25}$, wherein NC is core speed and $\Theta 25$ is compressor inlet static temperature). The $\delta 25$ indicates the ratio between (a) compressor inlet pressure at altitude and (b) standard atmospheric pressure at sea level. The $\delta 25$, in indicating a ratio of pressures, indicates the relative density of the incoming air to the compressor.

By indicating relative density, $\delta 25$ indicates the relative loading on the compressor; a higher density means that more energy is required to accelerate the compressor, meaning that more fuel is required to attain the acceleration. However, at higher altitudes, higher fuel flows can more easily cause a stall. Block 139 compensates for the stall by correcting scheduled acceleration based on relative air density, in order to prevent a fuel flow which is too large.

The desired acceleration, on line 139B, is modified according to the amount of compressor bleed being used, in block 143, for reasons similar to those discussed in connection with block 126: bleed increases fuel-air ratio. Then, the desired acceleration is modified by $\delta 25$. The modification serves to remove $\delta 25$ from the denominator of the term (NC-dot)/$\delta 25$, producing a term having the units of acceleration (i.e., rpm/sec$^2$). This term is a desired acceleration which is scheduled from the point of view of stall protection, and is fed to summer 150.

Also fed to summer 150 are two other parameters. One is the actual acceleration, indicated as NC-dot actual. The other is a modifier, originating in block 153, which is based on (a) the temperature of a selected component in the engine, taken as representative of engine temperature, and (b) T25. This modifier reconciles the conflicting demands which atmospheric temperature and engine physical temperature can place upon fuel flow.

For example, if air temperature is very cold, such as minus 20 degrees F, as occurs in arctic conditions, the lubricating oil in the engine can be quite viscous, requiring extra fuel to attain a given acceleration. Similarly, if the fuel is also cold, extra fuel is required to compensate for the poor combustion effects associated with high fuel viscosity. However, if the engine's metallic parts are warm or hot, the extra fuel can more easily cause a stall. Blocks 153 and 155 modify acceleration to accommodate these factors. One type of modification is to raise fuel delivery rate by 50 to 100% over the rate used at positive 60 degrees F. The modification is used when air temperature is below minus 20 F., and the engine, oil, and fuel are all similarly cold.

The output of the summer 150 gives an error signal, which is the deviation of actual acceleration from the scheduled acceleration, the deviation being adjusted by inferred ambient temperature. In order to convert this output into terms of fuel flow, a gain block 163 is used. Gain block 163 receives as input a fuel quantity from block 161. Block 161 schedules δτ/δWf (which is the partial derivative of torque, τ, with respect to Wf, fuel flow) as a function of core speed, NC. That is, block 161 gives the change in torque which will occur with a given change in fuel flow at any selected speed. Thus, the output of gain block 163 is the fuel flow needed to attain the target acceleration provided by summer 150.

Absolute Limits on Fuel

Block 187 provides an absolute limit to fuel flow based on altitude and mach number. MAX SELECT block 189 assures that the output, on line 190, cannot fall below this limit. Line 190 provides the scheduled fuel flow for the engine.

STAFF-PRONE INQUIRY

FIG. 5

Figure 5:
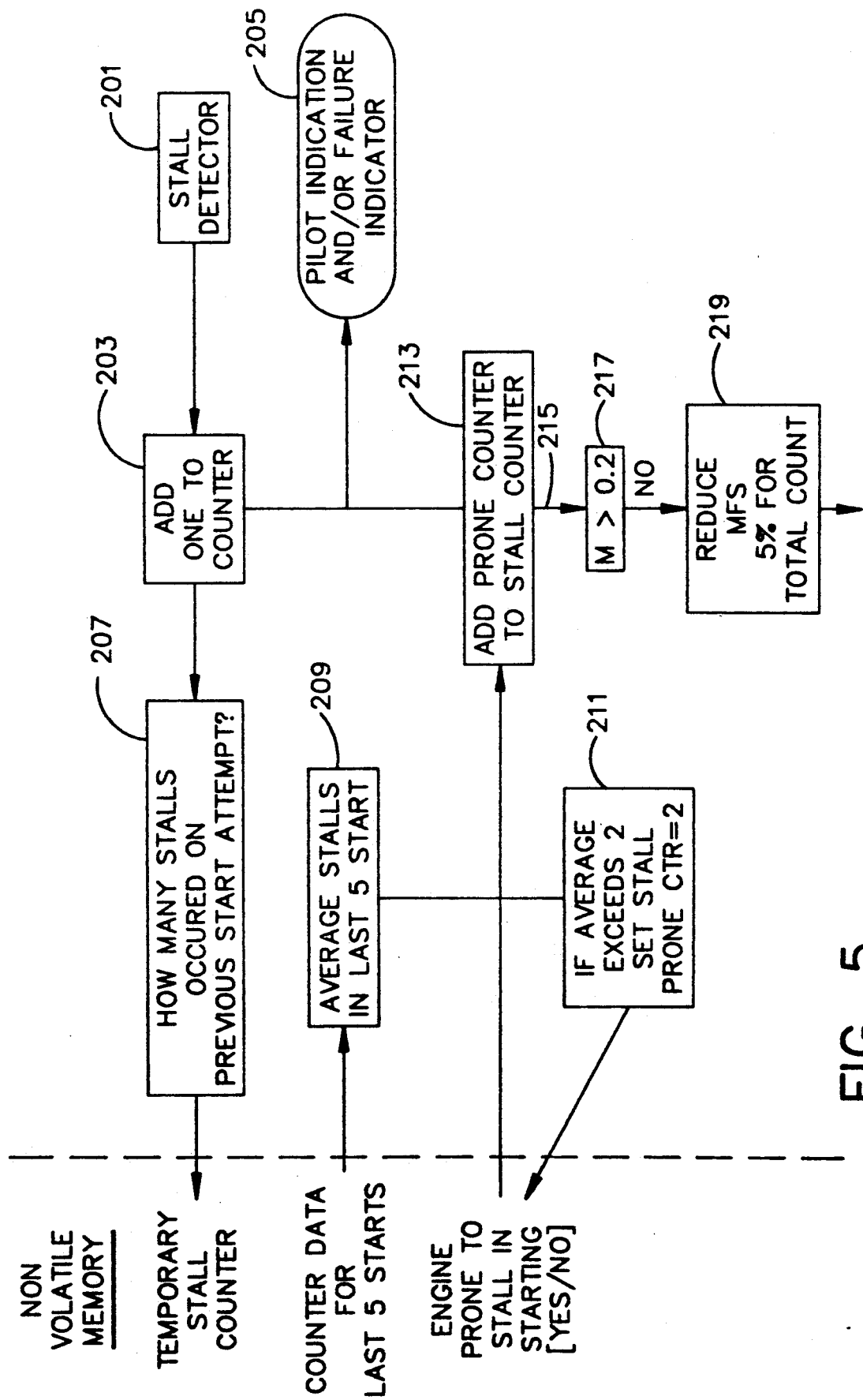
FIG. 5 illustrates apparatus for ascertaining whether a given engine is stall-prone.

FIG. 5 illustrates procedures which detect whether a given engine is prone to stalls, and the corrective action to be taken in response. FIG. 5 gives more detail on the blocks 80 and 83 in FIG. 1.

The logic in FIG. 5 starts in block 201, which is reached if a stall is detected, and then a stall counter is incremented by one, in block 203. The stall counter indicates the total number of stalls detected so far in the current start attempt, and this number is indicated to the pilot by block 205. The logic branches from block 203. One branch goes to the left, to block 207, which refers to the stall count which occurred in the last start-up attempt. This count is stored in memory, indicated as "TEMPORARY STALL COUNTER."

The average of the stall counter for the last five starts is computed in block 209. If the average exceeds a fixed number, which is TWO in block 211, then a flag is set which indicates that the engine is stall-prone. The flag is indicated by the phrase "ENGINE IS PRONE TO STALL IN STARTING (YES/NO)" in NON VOLATILE MEMORY. This flag is presented to block 213.

Returning to the branch in the logic, block 213 modifies the fuel rate, based on two factors, namely, (1) the number of stalls already occurred during the present attempt (given by block 203) and (2) whether the engine is stall-prone (given by the flag). Block 213 adds the stall counter (from block 203) to the stall-prone counter (which is TWO if the flag is set, zero otherwise).

For example, if the engine is not stall-prone (as defined in block 211), and if one stall has occurred in the present start attempt, then the number on line 215 is one. If the engine is, in fact, stall-prone, and one stall has occurred, then the number is three (1+2). If the engine is stall-prone, and three stalls have occurred, the number on line 215 is five (3+2).

Block 217 inquires whether mach number exceeds 0.2. If not, the aircraft is assumed to be one the ground. The logic proceeds to block 219, which reduces fuel flow by five percent for each count provided by block 213. In the respective examples above, the percentages are 5% (i.e., 1×5%); 15% (i.e., 3×5%); and 25% (i.e., 5×5%). Block 219 corresponds in function to block 83 in FIG. 1.

After a given start, the data regarding the stall counts is updated, as indicated by block 310 in FIG. 1.

The preceding discussion has set forth systems and procedures which take action when certain conditions are met, such as speeds, temperatures, and mach numbers reaching certain values. It must be recognized that the values given herein are used in connection with the particular engines controlled by one specific embodiment of the invention. Other engines can, and probably will, require different values. However, the inventive concepts can still apply.

It is noted that mach number has been used in order to ascertain whether the aircraft is airborne. However, other indicators can be used, such as whether weight is being applied to the aircraft's wheels.

Numerous substitutions and modifications can be undertaken without departing from the true spirit and scope of the present invention. What is desired to be secured by Letters Patent is the invention as defined in the following claims.

We claim:

1. A method of starting a gas turbine engine comprising the steps of:
   measuring engine mach speed;
   comparing said measured mach speed to a predetermined minimum mach speed;
   generating a first signal adapted to open a starter air valve on said engine when said measured mach speed is less than said predetermined minimum;
   measuring engine core speed;
   generating a second signal adapted to activate a first set of igniters when said engine core speed exceeds a first predetermined percentage of rated maximum core speed;
   generating a third signal adapted to open a fuel valve when said core speed exceeds a second predetermined percentage of rated maximum core speed;
   measuring changes in compressor acceleration rates and comparing said changes to a predetermined value and generating a fourth signal adapted to shut down said engine if said changes are less than said predetermined value.

2. A method according to claim 1 wherein:
   said predetermined minimum mach speed is 0.2;
   said first predetermined percentage of rated maximum core speed is 15 percent; and
   said second predetermined percentage of rated maximum core speed is 20 percent.

3. A method according to claim 1 further comprising the steps of:
   detecting light-off a predetermined time period after generating said second signal;
   generating a fifth signal adapted to close said fuel valve if light-off is not detected after said predetermined period of time;
   generating a sixth signal adapted to activate a second set of igniters after said predetermined period;
   generating a seventh signal adapted to re-open said fuel valve.

4. A method of starting a gas turbine engine comprising the steps of:
   measuring engine mach speed;
   comparing said engine mach speed to a predetermined minimum mach speed;
   generating a first signal adapted to activate a starter on said engine when said measured mach speed is less than said predetermined minimum;
   measuring engine core speed;

generating a second signal adapted to activate a first set of igniters when said engine core speed exceeds a first predetermined percentage of rated maximum core speed;

generating a third signal adapted to open a fuel valve when said core speed exceeds a second predetermined percentage of rated maximum core speed;

measuring changes in compressor acceleration rates and comparing said changes to a predetermined value and generating a fourth signal adapted to shut down said engine if said signal is less than said predetermined value.

5. A method according to claim 4 wherein:

said predetermined minimum mach speed is 0.2;

said first predetermined percentage of rated maximum core speed is 15 percent; and said second predetermined percentage of rated maximum core speed is substantially equal to said first predetermined percentage of rated maximum core speed.

6. A method according to claim 4 further comprising the steps of:

detecting light-off a predetermined time period after generating said second signal;

generating a fifth signal adapted to close said fuel valve if light-off is not detected after said predetermined period of time;

generating a sixth signal adapted to activate a second set of igniters after said predetermined period;

generating a seventh signal adapted to re-open said fuel valve.

* * * * *